United States Patent
Benedetti

(10) Patent No.: US 11,180,324 B2
(45) Date of Patent: Nov. 23, 2021

(54) UNLOADING APPARATUS FOR HORTICULTURAL PRODUCTS SUCH AS BLUEBERRIES AND THE LIKE

(71) Applicant: UNITEC S.P.A., Lugo (IT)

(72) Inventor: Luca Benedetti, Ravenna (IT)

(73) Assignee: UNITEC S.P.A., Lugo (IT)

( * ) Notice: Subject to any disclaimer, the term of this patent is extended or adjusted under 35 U.S.C. 154(b) by 677 days.

(21) Appl. No.: 16/076,163

(22) PCT Filed: Feb. 7, 2017

(86) PCT No.: PCT/IB2017/050645
§ 371 (c)(1),
(2) Date: Aug. 7, 2018

(87) PCT Pub. No.: WO2017/137886
PCT Pub. Date: Aug. 17, 2017

(65) Prior Publication Data
US 2021/0188568 A1     Jun. 24, 2021

(30) Foreign Application Priority Data
Feb. 8, 2016   (IT) .................. 102016000012566

(51) Int. Cl.
*B65G 11/20*   (2006.01)
*B65G 47/44*   (2006.01)
*B65G 47/52*   (2006.01)

(52) U.S. Cl.
CPC .......... *B65G 47/525* (2013.01); *B65G 11/203* (2013.01); *B65G 47/44* (2013.01); *B65G 2201/0211* (2013.01)

(58) Field of Classification Search
CPC ...... B65G 11/20; B65G 11/203; B65G 47/44; B65G 47/525

(Continued)

(56) References Cited

U.S. PATENT DOCUMENTS 4,132,634 A *  1/1979  Rumpf ............... B07B 7/02
                                                     209/136
4,137,155 A *  1/1979  Clin .................. B07B 11/06
                                                     209/134

(Continued)

FOREIGN PATENT DOCUMENTS

| GB | 1547871 A | 6/1979 |
| SU | 1350059 A1 | 11/1987 |
| WO | 9200907 A1 | 1/1992 |

OTHER PUBLICATIONS

International Search Report dated Apr. 20, 2017 re: Application No. PCT/IB2017/050645, pp. 1-3.

(Continued)

*Primary Examiner* — Douglas A Hess
(74) *Attorney, Agent, or Firm* — Cantor Colburn LLP

(57) ABSTRACT

An unloading apparatus for horticultural products such as blueberries and the like, which are conveyed along a predefined advancement path by respective movement units includes at least one dispenser of pressurized fluid, which can be activated on command during the transit of each product in order to send a jet of the pressurized fluid toward the product and consequently cause its fall from the respective movement unit. The apparatus also includes at least one deflector screen arranged facing and proximate to the dispenser, on the opposite side with respect to the predefined trajectory in order to intercept the products struck by the jet. The screen is inclined so as to define, between its face directed toward the dispenser and a vertical plane that passes through the dispenser, a work angle one and ninety degrees configured for the optimum downward deflection of the products.

10 Claims, 4 Drawing Sheets

(58) Field of Classification Search
USPC ........ 198/406, 416, 493, 564, 637; 209/537, 209/644
See application file for complete search history.

(56) References Cited

U.S. PATENT DOCUMENTS

| | | | | |
|---|---|---|---|---|
| 4,266,477 | A * | 5/1981 | Ackley | B41F 17/36 101/40 |
| 4,279,346 | A * | 7/1981 | McClure | B07C 5/3416 209/582 |
| 5,305,867 | A * | 4/1994 | Leaton | B65G 47/52 198/377.06 |
| 5,339,964 | A * | 8/1994 | Gray | B07C 5/3422 198/493 |
| 5,957,306 | A * | 9/1999 | Hoffman | B07C 5/38 209/587 |
| 6,155,408 | A * | 12/2000 | Heuft | B65G 47/244 198/836.1 |
| 6,354,440 | B1 * | 3/2002 | Thone | B07B 4/00 209/644 |
| 6,651,801 | B1 | 11/2003 | Heckendorf | |
| 7,121,399 | B2 * | 10/2006 | Mills | B07C 5/363 198/438 |
| 9,561,614 | B2 * | 2/2017 | Novak | B65G 47/1435 |
| 9,790,036 | B2 * | 10/2017 | Roehring | B65B 35/56 |
| 9,809,399 | B1 * | 11/2017 | Lindauer | B65G 51/02 |
| 10,464,761 | B1 * | 11/2019 | Doak | B65G 51/02 |

OTHER PUBLICATIONS

Written Opinion dated Apr. 20, 2017 re: Application No. PCT/IB2017/050645, pp. 1-6.
RU Office Action dated Jun. 4, 2020 re: Application No. 2018132045/10, pp. 1-10.

* cited by examiner ts of the line.
UNLOADING APPARATUS FOR HORTICULTURAL PRODUCTS SUCH AS BLUEBERRIES AND THE LIKE

TECHNICAL FIELD

The present disclosure relates to an unloading apparatus for horticultural products such as blueberries and the like.

BACKGROUND

As is known, the need to contain the costs for producing and providing products drives companies toward the automation of industrial processes, to ensure the satisfaction of customers that are increasingly numerous and demanding, yet at competitive sale prices.

It is easy to find such an outlook in the food industry and, specifically, in companies that operate in the processing and distribution of fruit.

Such companies in fact usually set up lines that are at least partially automated, which are dedicated in each instance to a different, specific fruit: these lines are fed with indiscriminate masses of the fruits of interest, often originating directly from the harvest fields, and therefore having great variability in terms of size, color, defects etc.

The lines are therefore provided with various stations, which conduct a series of checks and treatments on the fruits, so as to be able to reject those that are below the required quality standards and, especially, to divide the processed masses into homogeneous subgroups (according to one or more preset parameters), for allocation to different subsequent processing treatments, or more simply for separate packing and distribution.

According to implementation solutions that are now conventional, such lines have, in an intermediate processing step, one or more video cameras, or other vision systems, that analyze each fruit in transit and by way of special software identify the value assumed by one or more parameters of interest.

The information detected by the video cameras is acquired and optionally analyzed by a centralized electronic unit for control and management, which control the activity of unloading devices located downstream.

More precisely, downstream of the video cameras each fruit is moved along a predefined path by a respective movement unit: the unloading devices are distributed on the path, and can be selectively actuated by the electronic unit.

According to conventional methods, each device is constituted substantially by a nozzle that is capable of dispensing on command a jet of compressed air, which transversely strikes the fruit, making it fall below the movement unit (on which it is usually merely resting), where there is a respective collection container or a corresponding moving mat leading to such container.

By having an adequate number of nozzles and containers (and optionally mats), in this way fruits can be homogeneously accumulated in each container, since, for each fruit, the electronic unit is capable of selecting and activating the nozzle corresponding to the container to which that fruit is to be sent, as a function of the values detected by the video cameras.

Such implementation solution is not however devoid of drawbacks.

It should be noted in fact that such unloading method can be extended to various different fruits, according to the specific requirements.

However, especially when the fruit is small, it is difficult to optimally control its fall, since even minimal variations in the intensity of the jet can determine strong variations in the fall trajectory of the fruit.

Such an eventuality is evidently unwelcome, since it can cause damage to the fruit or its release into an incorrect area, thus impeding the collection thereof in the containers or, worse, causing jams or damage to the other elements of the line.

The drawbacks indicated above are even more unwelcome on lines used for processing blueberries.

In fact, as is known such fruit is very delicate, and therefore it requires great care in its handling in order to prevent any impact or damage. In addition, it is a substantially prized fruit, owing to its low availability in nature which contrasts with its high approval by customers.

Inadequate control of blueberries, in the step of falling, is therefore even more damaging, since even minimal percentages of blueberries that are damaged and hence have to be rejected evidently lead to an unwanted loss of product and therefore to an unacceptable increase in costs.

SUMMARY

The aim of the present disclosure is to solve the above mentioned problems, by providing an apparatus that ensures the optimal unloading of horticultural products, for example such as blueberries and the like, that transit along a processing line.

Within this aim, the disclosure provides an apparatus that ensures the conveyance of horticultural products toward a specific predefined area.

The disclosure also provides a versatile apparatus, that can be easily adjusted and adapted to different calibers of horticultural products, or to different horticultural products.

The disclosure also provides an apparatus that ensures a high reliability of operation and keeps the number of rejects very low, even eliminating them entirely.

The disclosure further provides an apparatus that adopts an alternative technical and structural architecture to those of conventional apparatuses.

The disclosure further provides an apparatus that is low cost and safely applied.

The disclosure provides an apparatus that can be easily implemented using elements and materials that are readily available on the market.

This aim and these and other advantages which will become better apparent hereinafter are achieved by providing an unloading apparatus for horticultural products such as blueberries and the like, which are conveyed along a predefined advancement path by respective movement units, that comprises at least one dispenser of pressurized fluid, which can be activated on command during the transit of each product, in order to send a jet of the pressurized fluid toward the product and consequently make it fall from the respective movement unit, characterized in that it comprises at least one deflector screen, which is arranged facing and proximate to said at least one dispenser, on the opposite side with respect to the predefined trajectory, in order to intercept the products struck by the jet, said screen being inclined so as to define, between its face directed toward said dispenser and a vertical plane that passes through said dispenser, a work angle comprised between one degree and ninety degrees, for the optimum downward deflection of the products.

BRIEF DESCRIPTION OF THE DRAWINGS

Further characteristics and advantages of the disclosure will become better apparent from the description of a preferred, but not exclusive, embodiment of the apparatus according to the disclosure, which is illustrated by way of non-limiting example in the accompanying drawings wherein.

DETAILED DESCRIPTION OF THE DRAWINGS

Figure 1:
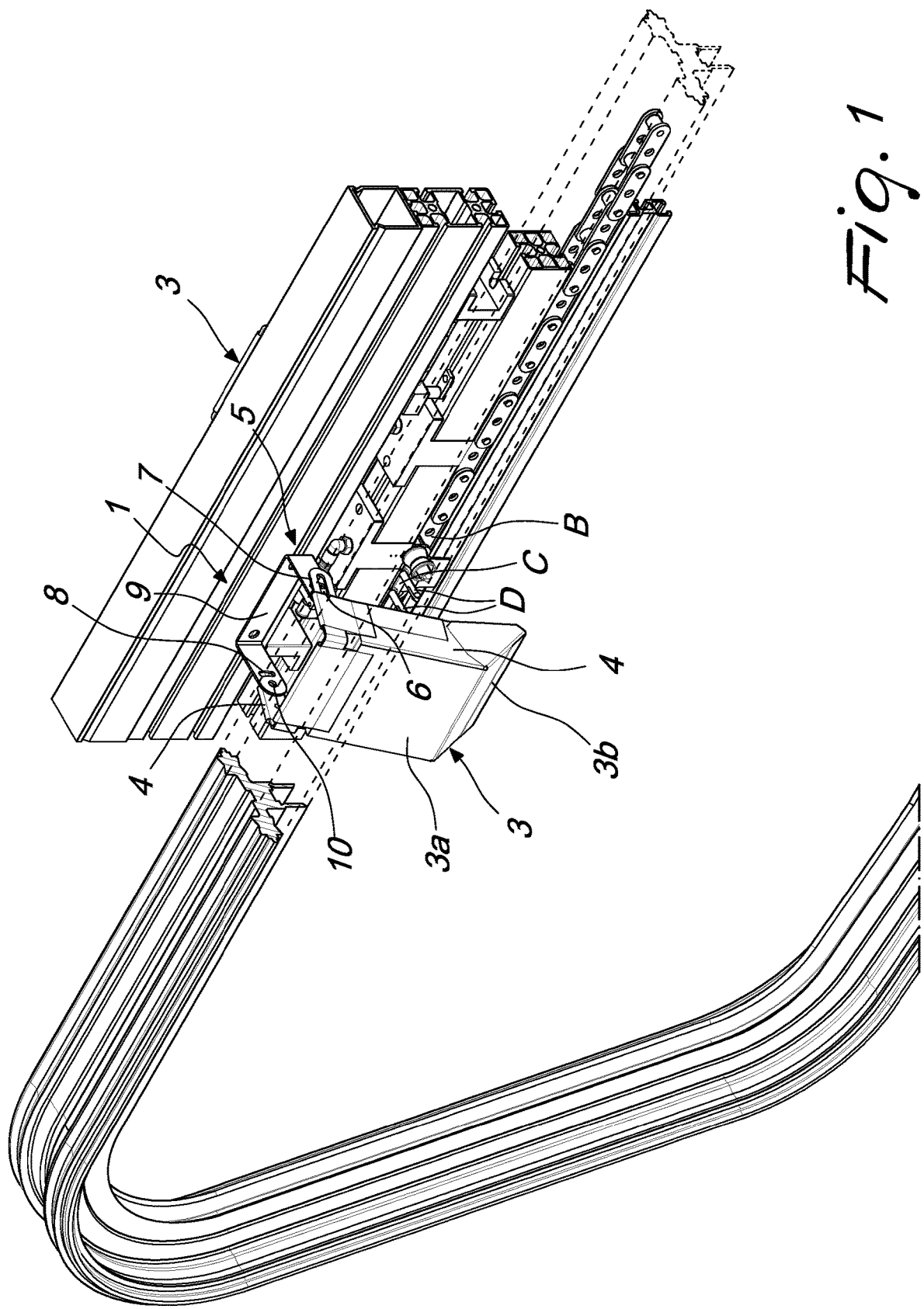
FIG. 1 is a perspective view of an embodiment that uses unloading apparatuses according to the disclosure.

With reference to FIGS. 1-5, the reference numeral 1 generally designates an unloading apparatus for horticultural products A such as blueberries and the like, which are conveyed along a predefined advancement path by respective movement units (on which, typically, they are simply resting).

In more detail, it should be noted from this point onward that in the preferred application of the disclosure, to which reference will frequently be made in the present discussion, the horticultural products A are in fact blueberries, with respect to which the peculiarities of the apparatus 1 are enhanced, as will be explained hereinbelow.

In any case, it should be emphasized from this point onward that the apparatus 1 can also be validly applied to different horticultural products A (cherries, blackberries, raspberries or strawberries for example).

Therefore, any reference that will be made hereinbelow to blueberries should be understood as being extended to any other fruit and vegetable product A.

The apparatus 1 comprises therefore at least one dispenser 2 of pressurized fluid: the pressurized fluid can be any (and therefore any liquid or gas), but in the preferred (non-exclusive) embodiment, the dispenser 2 is constituted by a nozzle associated with a pneumatic circuit, in turn affected by a source of compressed air (which constitutes the pressurized fluid).

The nozzle (or other dispenser 2) can be activated on command (typically by a controller, by a computer, or by another electronic control and management unit), during the transit of each product A. In this manner, the dispenser 2 can send a jet of compressed air (or other pressurized fluid) toward the product A along a direction that is substantially (horizontal and) transverse to the predefined path, in order to cause the consequent fall thereof from the respective movement unit.

It should be noted that in the typical embodiment, which is moreover illustrated in the accompanying figures, one or more apparatuses 1 (and preferably a plurality of apparatuses 1, as will be seen) are arranged along an end portion of a line for processing blueberries (or other horticultural products A), in order to send them, in homogeneous subgroups, to respective containers for collection (each one associated with a respective apparatus 1).

Upstream of the end portion in fact, each blueberry is viewed by a video camera or other control system, so as to transmit to the electronic unit the value assumed by one or more parameters of interest (color, caliber, defects, sugar content etc).

Each container, or optionally a conveyor belt leading to it, is arranged under the transit area of the blueberries, along the fall trajectory (or other fall path) set by the apparatus 1.

Thus, the electronic unit can in each instance activate the dispenser 2 corresponding to the container to which each blueberry needs to be sent, as a function of the values assumed by the parameters of interest.

In such embodiment, at the end portion of the line the movement units are entrained by a chain B, wound in a loop and defining, with an upper portion thereof, the predefined path.

With the chain B, a fixed plate C can therefore mesh with each movement unit, to which respective supports D are fixed, to which rollers or bearings can be coupled, which are capable of offering a support to the blueberries (or other horticultural products A).

The support ensures the entrainment of the blueberries along the predefined path, but at the same time it is made so as to not impede their falling, when the horticultural products A are struck by the jet of compressed air.

In any case, the possibility is not ruled out of moving the blueberries along the path of advancement in another manner, or to employ one or more apparatuses 1 at different times of their treatment process.

According to the disclosure, the apparatus 1 comprises at least one deflector screen 3, which is arranged along the line so as to be facing and proximate to the dispenser 2, on the opposite side with respect to the predefined path (i.e. the transit area of the blueberries is interposed between the dispenser 2 and the screen 3).

Thus, the screen 3 is capable of intercepting the products A struck by the jet.

Figure 5:
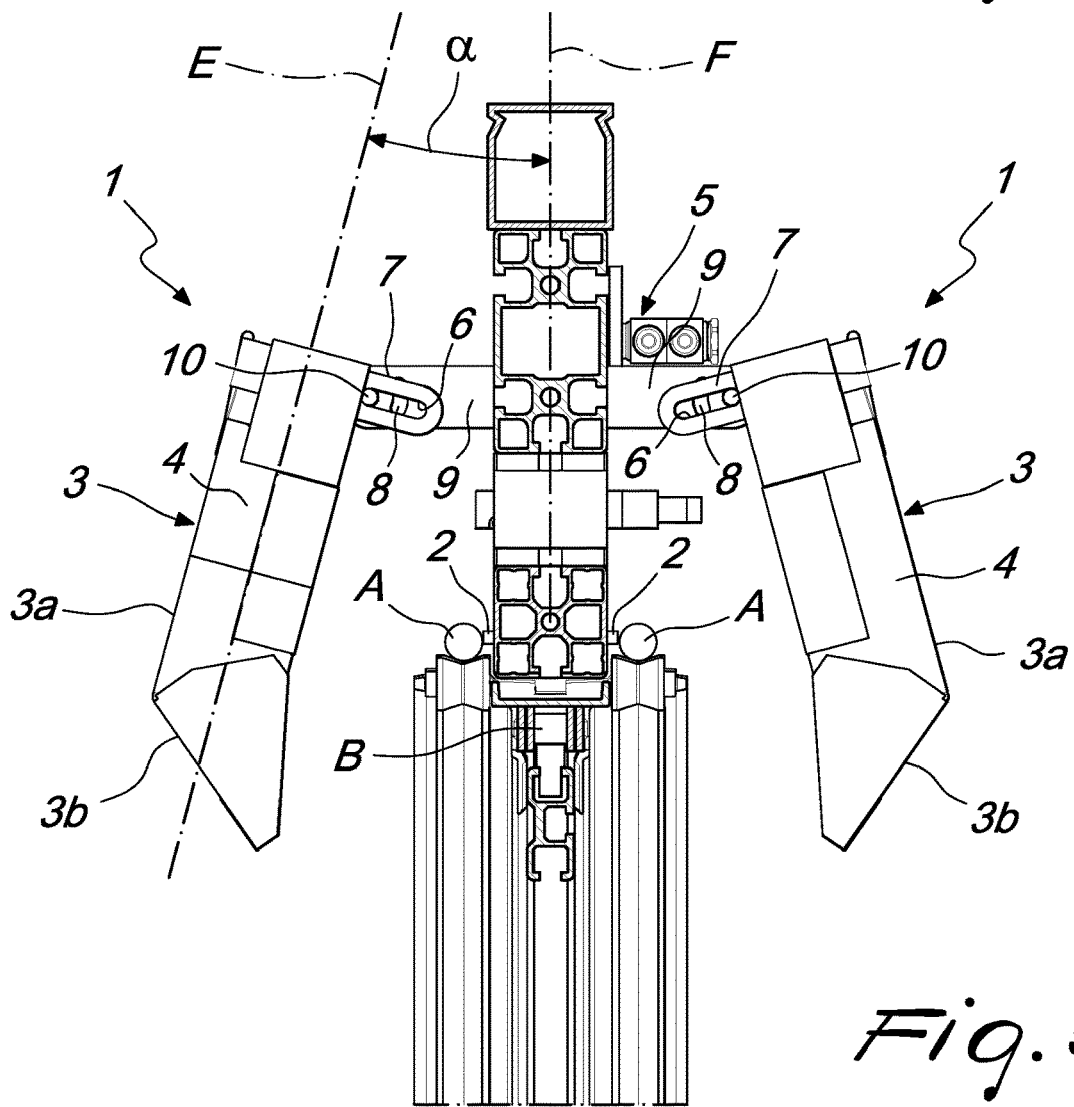
FIG. 5 is a cross-sectional view of the embodiment of FIG. 1, taken along a plane perpendicular to the predefined advancement path.

Furthermore, as is clearly shown in FIG. 5, the screen 3 is inclined so as to define, between its face directed toward the dispenser 2 (contained on an ideal plane E) and a vertical plane F that passes through the dispenser 2, a work angle $\alpha$ comprised between one degree and ninety degrees, for the optimum downward deflection of the products A.

So effectively, each blueberry can be made to fall from the respective movement unit by way of the jet of compressed air sent by the dispenser 2, which impresses a thrust in a transverse direction. After a few centimeters (as a function obviously of the distance at which the screen 3 is arranged), the natural and potentially uncontrolled fall parabola of the blueberry (now subject to the force of gravity) is interrupted by the screen 3, which deflects it downward in a controlled manner.

The screen 3 therefore ensures the set aim is achieved: all the blueberries struck by the flow are of course intercepted by it (by conveniently choosing the mutual distances between the components involved), and therefore the mere presence of the screen 3 guards against the danger that an excessive thrust could throw them beyond the underlying container.

The inclination conferred to the screen 3 ensures that the rebound of the blueberries directs them downward, and toward the container, preventing them from leaping upward or in any case being deflected in an uncontrolled and unwanted direction.

In particular, the screen 3 is inclined so as to define (as mentioned, between its face directed toward the dispenser 2 and the vertical plane F), a work angle $\alpha$ comprised between one degree and twenty degrees. Even more specifically, in a solution of significant practical interest, which enables an effective conveyance of the horticultural products, the screen 3 is inclined so as to define a work angle $\alpha$ equal to thirteen degrees.

Other embodiments are however not ruled out, in which the angle $\alpha$ assumes different values, according to the specific requirements.

For the purpose of obtaining an optimal conveyance, conveniently the unloading apparatus 1 comprises at least one lateral containment partition 4, which extends from a side of the screen 3 and is directed toward the respective dispenser 2.

It should be noted in fact that usually the blueberries move at great speed along the path of advancement, in order to obtain the treatment of a high number of horticultural products A per unit of time, and therefore high levels of productivity. Hence, when the blueberries are struck by the jet of compressed air, not only are they directed toward the screen 3 according to a direction transverse to the advancement direction, following the jet, but they also assume a longitudinal inertial motion component, which is due to their rapid advancement. The presence of at least one partition 4 (in particular, of a partition 4 located on the opposite side with respect to the origin of the blueberries) makes it possible to also block those blueberries that, by virtue of their inertial motion component, could otherwise be projected beyond, downstream of the screen 3, without being deflected by the latter.

In the preferred embodiment, and in order to prevent any kind of anomaly in the travel imposed by the jet on the blueberries, the apparatus 1 comprises a pair of partitions 4, which extend therefore from the respective sides of the screen 3 and are directed toward the respective dispenser 2.

In the preferred embodiment, shown in the accompanying figures for the purposes of non-limiting example of the application of the disclosure, the screen 3 comprises a main lamina 3*a* (metallic or polymeric, for example), facing and proximate to the dispenser 2, and intended to block the blueberries struck by the jet. Furthermore, the screen 3 comprises a lower laminar beak 3*b*, preferably made of the same material as the lamina 3*a* and extending below the latter. The beak 3*b* is partially folded toward the dispenser 2.

The beak 3*b* can cause an additional rebound and an additional deflection of the blueberries struck by the jet, thus contributing to their optimal conveyance (according to more structured fall paths) toward the desired underlying area.

It should be noted that in the solution shown for the purposes of non-limiting example in the accompanying figures, each partition 4 is also composed of two mutually inclined portions, which are contiguous respectively with the lamina 3*a* and with the beak 3*b*.

Conveniently, the screen 3 can be coupled to a fixed supporting frame 5, directly or indirectly, according to a plurality of different operating configurations. Such choice ensures the disclosure is highly versatile, since each operating configuration corresponds to a different relative position of the screen 3 with respect to the dispenser 2. This makes it possible to vary at will the fall mode of the blueberries, or of other horticultural products A, during the initial set-up, or following changes in related conditions, in different calibers of the horticultural products A, or even a move to other processed products A.

In each operating configuration therefore, the screen 3 is removably fixed to the frame 5 by way of at least one respective locking element (not shown for the sake of simplicity in the accompanying figures but which, as will be seen, can be conventional).

Figure 2:
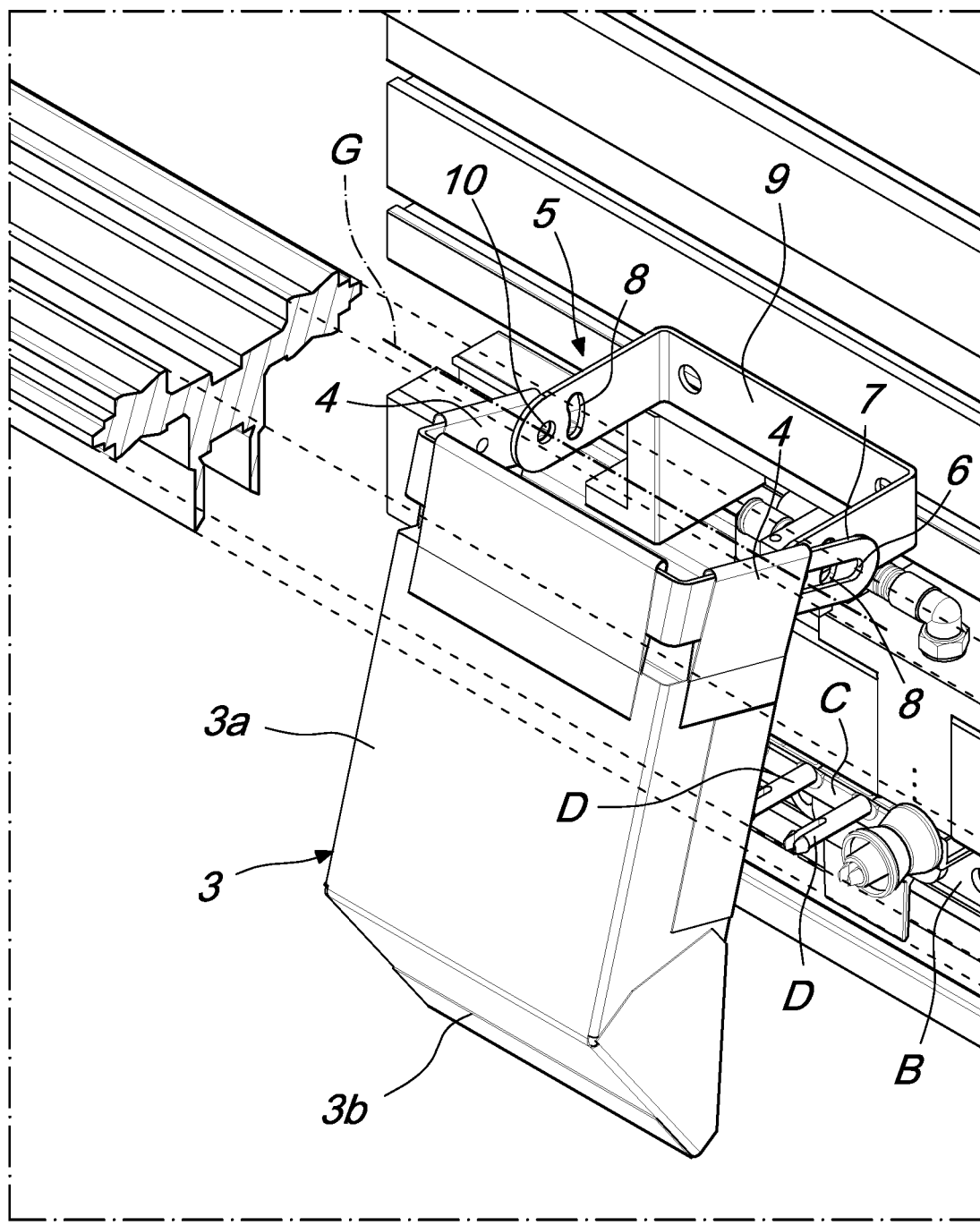
FIG. 2 is a greatly enlarged detail of FIG. 1.

In particular, in a first embodiment of significant practical interest, the screen 3 is rotatably coupled to the frame 5 about a rotation axis G (shown for the sake of simplicity in FIG. 2 only). The following pages show a possible embodiment of the rotatable coupling, along the rotation axis G.

During set-up, first installation or subsequent adaptation of the line, by rotating the screen 3 it is thus possible to define multiple operating configurations, of rotation, which correspond to different values assumed by the work angle $\alpha$.

In order to obtain the stable coupling of the screen 3 to the frame 5, in each operating rotation configuration at least one hole 6 provided on a respective tab 7, in turn protruding from a corresponding partition 4, is aligned with a respective contoured slot 8, which is instead provided on a bracket 9 comprised in the frame 5.

Thus, after having rotated the screen 3 about the rotation axis G until the desired operating rotation configuration is reached, a locking element, such as a bolt, a screw, a rivet, and the like, can be inserted into the hole 6 and into the slot 8, thus obtaining the desired anchoring of the screen 3 (stable, but easily removable, if it is desired to change the work angle $\alpha$ again).

Even more specifically, in the preferred, non-exclusive embodiment, the screen 3 is rotatably coupled to the frame 5 at at least one pivot (which is also, for the sake of simplicity, not shown in the accompanying figures), which is arranged along the rotation axis G.

Figure 3:
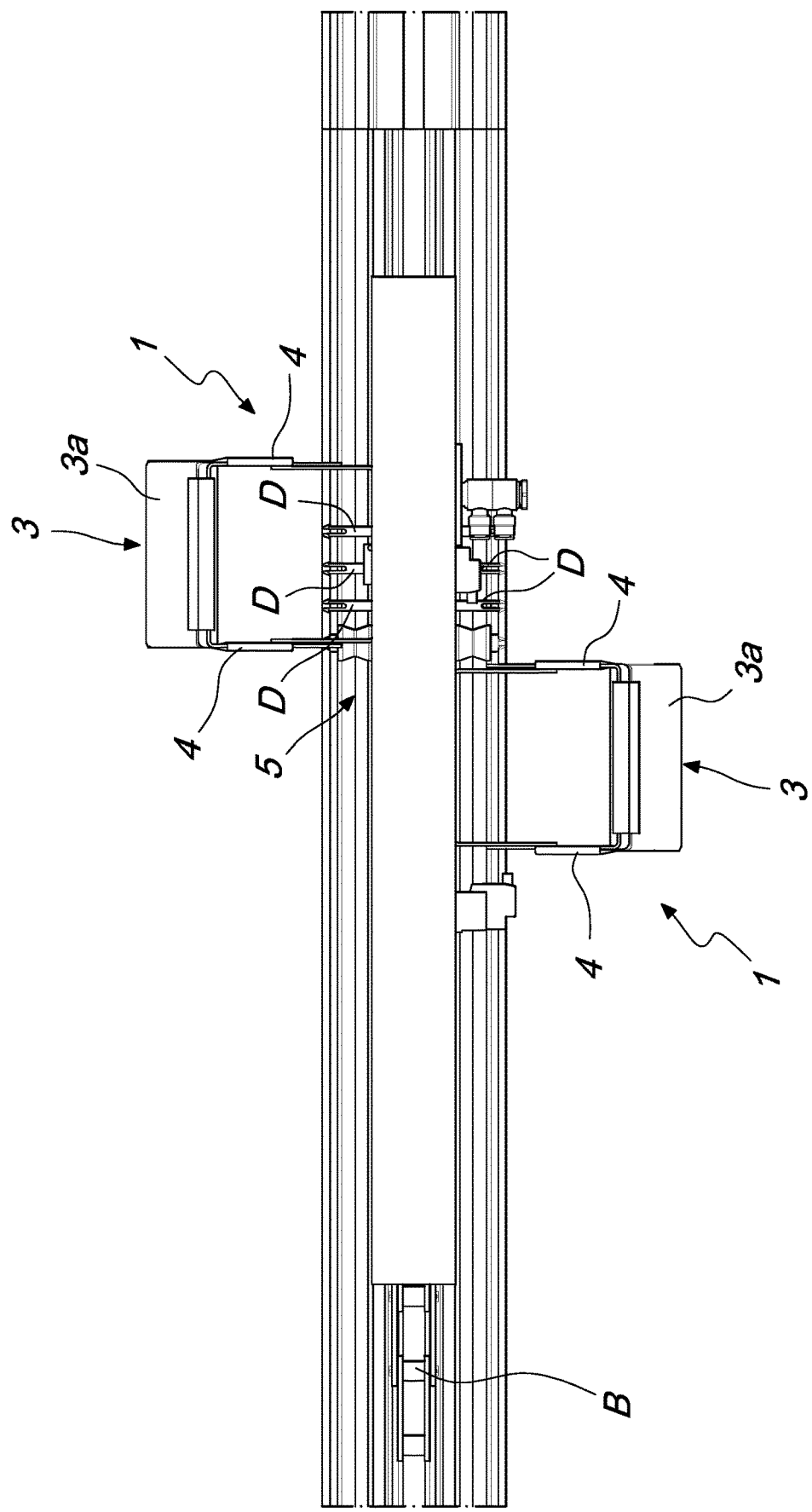
FIG. 3 is a view from above of the embodiment of FIG. 1.
Figure 4:
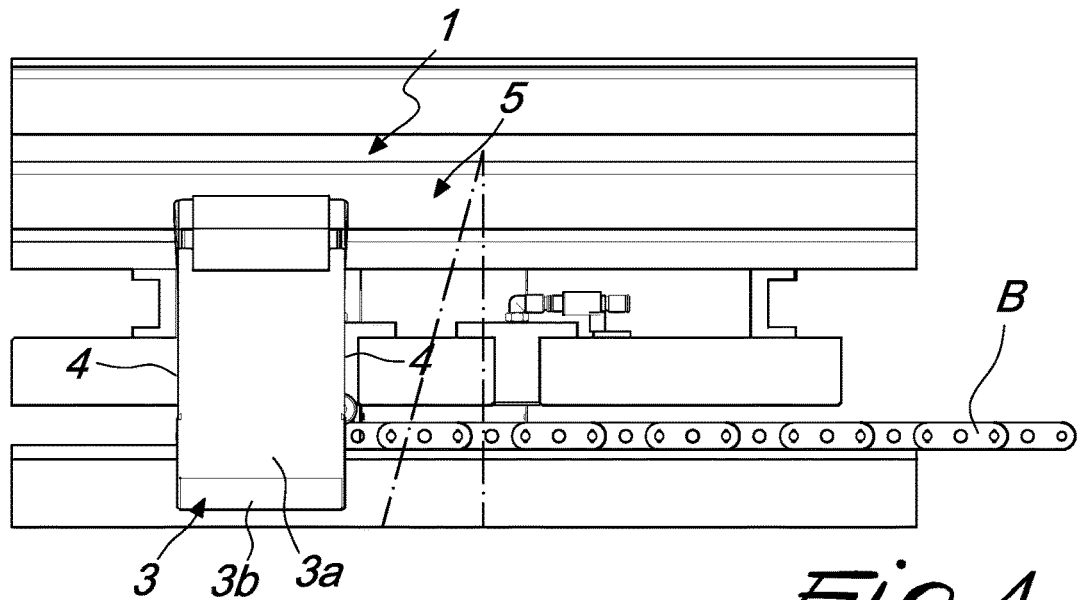
FIG. 4 is a side view of the embodiment of FIG. 1.

The pivot can be inserted into an eyelet 10, defined by the bracket 9, and into the above mentioned hole 6, which is obtained along the tab 7 and which, in order to confer additional versatility on the disclosure, has an elongated shape (as can be seen for example from FIGS. 1, 3 and 5).

In this manner in fact, its alignment is possible with the eyelet 10 according to a plurality of different positions of the screen 3 with respect to the dispenser 2. Each one of such positions thus corresponds to different center distances between the screen 3 and the dispenser 2, and defines further operating configurations, in this case sliding configurations.

Moreover, it appears evident that the operating sliding configurations can easily be varied, by temporarily removing the locking elements and/or the pivots, as previously noted for the operating rotation configurations.

Actually, therefore, by rotating the screen 3 about the rotation axis G it is possible to identify different operating configurations, of rotation, each one of which corresponds to a different value of the work angle $\alpha$.

Likewise, the elongated shape of the hole 6 makes it possible to slide the screen 3 with respect to the frame 5 and to the rotation axis G (which passes through the eyelet 10), and therefore makes it possible to identify different operating configurations, of sliding, each one of which corresponds to a different center distance between the screen 3 and the dispenser 2.

Only after having identified the desired configuration, it is possible to anchor the screen 3 to the frame 5 by way of the pivot and/or the locking element, in order to allow the normal operation of the apparatus 1.

It should be noted that the possibility is not ruled out of providing apparatuses 1 in which only a variation of the center distance between the screen 3 and the dispenser 2 is allowed.

In the preferred embodiment, shown in the accompanying figures by way of non-limiting example, the apparatus 1 comprises two tabs 7, which are mutually parallel and which extend from corresponding partitions 4.

Each tab 7 therefore has a hole 6 that can be aligned with a respective slot 8 and a corresponding eyelet 10, for the insertion of corresponding locking elements and pivots.

Operation of the apparatus according to the disclosure is thus evident from the foregoing discussion.

Each dispenser 2 can be activated upon the transit of each blueberry, if it is desired to direct it toward the underlying area, in order to emit a jet of compressed air with which to make the blueberry fall from the movement unit that is conveying it.

The drop is controlled by the screen 3, which intercepts the blueberry struck by the jet and which, with its inclined arrangement, ensures its conveyance toward the specific area desired.

The screen 3 offers various methods of adjusting its configuration (corresponding to the many operating rotation and/or sliding configurations that it can assume), so as to be easily adjusted and adapted to different calibers of horticultural products A, or to different horticultural products A, thus giving maximum versatility to the apparatus 1 according to the disclosure.

As has been seen, in the preferred application, a plurality of apparatuses 1 are arranged along the same line (they can be aligned or even on multiple parallel rows), so as to direct toward different containers the blueberries that progressively advance along the line, according to preset criteria.

The apparatus 1 can in any case be validly applied to other practical contexts as well, in which it is necessary to obtain practical and exact methods of unloading horticultural products A by controlled falling.

In any case, the presence of the screen 3, conveniently inclined, ensures a high reliability of operation and keeps the number of rejects very low, even eliminating them entirely.

The use of the apparatus 1 according to the disclosure is therefore of undoubted practical interest in association with any type of processing line and for any horticultural product A, precisely because of the possibility of effectively conveying the products A during the fall and because of the versatility highlighted hereinabove.

Likewise, such advantages are enhanced with regard to the preferred application, and therefore the treatment of blueberries, since the substantial lack of discards assumes even more prominence for such fruit, in view of the particularly high unit cost.

In practice it has been found that the apparatus according to the disclosure fully achieves the set aims and advantages, since the use of at least one deflector screen, arranged facing and proximate to the dispenser of pressurized fluid, on the opposite side with respect to the predefined path, and conveniently inclined, ensures optimal methods of deflection and unloading of the horticultural products, for example such as blueberries and the like.

The disclosure, thus conceived, is susceptible of numerous modifications and variations. Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The content of Italian patent application no. 102016000012566 (UB2016A000563), the priority of which is claimed in the present application, is incorporated as a reference.

The invention claimed is:

1. An unloading apparatus for horticultural products conveyed along a predefined advancement path by respective movement units, the apparatus comprises at least one dispenser of pressurized fluid configured to be activated on command during the transit of each product in order to send a jet of the pressurized fluid toward the product such that the product falls from the respective movement unit, and further comprising at least one deflector screen arranged facing and proximate to said at least one dispenser on the opposite side with respect to the predefined trajectory in order to intercept the products struck by the jet, said screen being inclined so as to define, between its face directed toward said dispenser and a vertical plane that passes through said dispenser, a work angle comprised between 1° and 90°, for the optimum downward deflection of the products, wherein said screen is configured to be coupled indirectly to a fixed supporting frame according to a plurality of different operating configurations corresponding to different relative positions of said screen with respect to said dispenser, in each one of said operating configurations said screen being removably fixed to said frame by way of at least one respective locking element.

2. The unloading apparatus according to claim 1, wherein said screen is inclined so as to form said work angle comprised between 1° and 20°.

3. The unloading apparatus according to claim 2, wherein said screen is inclined so as to form said work angle equal to 13°.

4. The unloading apparatus according to claim 1, wherein said dispenser is a nozzle associated with a respective pneumatic circuit affected by a compressed air source, which constitutes said pressurized fluid.

5. The unloading apparatus according to claim 1, further comprising at least one lateral containment partition extending from a side of said screen and directed toward the respective said dispenser.

6. The unloading apparatus according to claim 5, further comprising a pair of said partitions extending from respective said sides of said screen and directed toward the respective said dispenser.

7. The unloading apparatus according to claim 1, wherein said screen comprises a main lamina facing and proximate to said dispenser, and a lower laminar beak extending downward from said lamina and partially folded toward said dispenser.

8. The unloading apparatus according to claim 1, wherein said screen is rotatably coupled to said frame about a rotation axis in order to define multiple said operating configurations for rotation corresponding to different values assumed by said work angle, in each one of said operating rotation configurations at least one hole provided on a respective tab protruding from a corresponding said partition being aligned with a respective contoured slot, provided on a bracket which is comprised in said frame, for the insertion into said hole and into said slot of a corresponding said locking element.

9. The unloading apparatus according to claim 8, wherein said screen is rotatably coupled to said frame at at least one pivot arranged along said rotation axis and insertable into an eyelet defined by said bracket and into said hole, which has an elongated shape for alignment with said eyelet according to a plurality of different positions of said screen with respect to said dispenser, which correspond to different center distances between said screen and said dispenser, which define additional operating configurations, for sliding.

10. The unloading apparatus according to claim 8, further comprising two of said tabs, mutually parallel and extending from corresponding said partitions, each one of said tabs having a said hole configured to be aligned with a respective said slot and a corresponding said eyelet for the insertion of corresponding said locking elements and said pivots.

* * * * *